United States Patent
Guo et al.

(10) Patent No.: US 11,805,456 B2
(45) Date of Patent: Oct. 31, 2023

(54) MULTIPLE TRIGGER EVENTS BASED CONDITIONAL HANDOVER IN 5G NR NETWORKS

(71) Applicant: Intel Corporation, Santa Clara, CA (US)

(72) Inventors: Yi Guo, Shanghai (CN); Candy Yiu, Portland, OR (US); Youn Hyoung Heo, Seoul (KR); Bharat Shrestha, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 265 days.

(21) Appl. No.: 17/101,543

(22) Filed: Nov. 23, 2020

(65) Prior Publication Data

US 2021/0176682 A1  Jun. 10, 2021

Related U.S. Application Data

(60) Provisional application No. 62/951,848, filed on Dec. 20, 2019.

(51) Int. Cl.
| | |
|---|---|
| *H04W 36/00* | (2009.01) |
| *H04W 76/27* | (2018.01) |
| *H04W 36/34* | (2009.01) |
| *H04W 36/36* | (2009.01) |
| *H04W 36/24* | (2009.01) |

(52) U.S. Cl.
CPC . *H04W 36/00837* (2018.08); *H04W 36/0058* (2018.08); *H04W 36/34* (2013.01); *H04W 36/36* (2013.01); *H04W 76/27* (2018.02); *H04W 36/24* (2013.01)

(58) Field of Classification Search
CPC .......... H04W 36/36; H04W 36/00837; H04W 36/08; H04W 36/0058; H04W 36/0061; H04W 24/10; H04W 36/0094
See application file for complete search history.

(56) References Cited

U.S. PATENT DOCUMENTS

| | | | | |
|---|---|---|---|---|
| 2020/0351734 | A1* | 11/2020 | Purkayastha | H04W 36/0094 |
| 2020/0383022 | A1* | 12/2020 | Shrestha | H04W 76/27 |
| 2021/0105672 | A1* | 4/2021 | Hwang | H04W 36/0058 |

* cited by examiner

*Primary Examiner* — Nam T Huynh
(74) *Attorney, Agent, or Firm* — Schwegman Lundberg & Woessner, P.A.

(57) ABSTRACT

A UE may decode a radio-resource control (RRC) reconfiguration message comprising a conditional handover (CHO) configuration (CHO-Config) which may identify a CHO configuration for at least one target candidate cell. The CHO configuration may include two or more CHO triggering events for an entry condition. The UE may monitor measurement quantities of the target candidate cell for the entry condition to determine if any of the CHO triggering events are met, start a first count-down timer when the entry condition of a first of the CHO triggering events is met and start a second count-down timer when the entry condition of a second of the CHO triggering events is met. The UE may apply the CHO configuration to the target candidate cell when both of the two CHO triggering events remain fulfilled upon expiration of the both timers.

20 Claims, 2 Drawing Sheets

FIG. 1
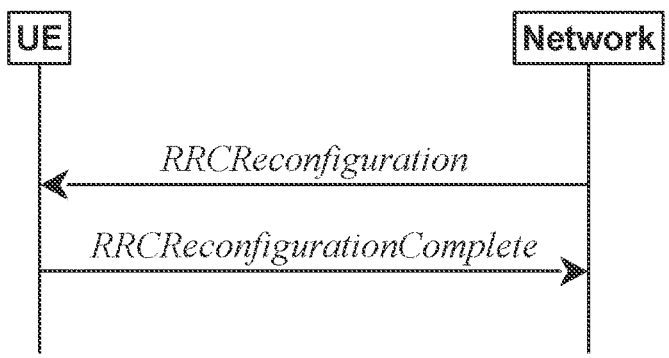
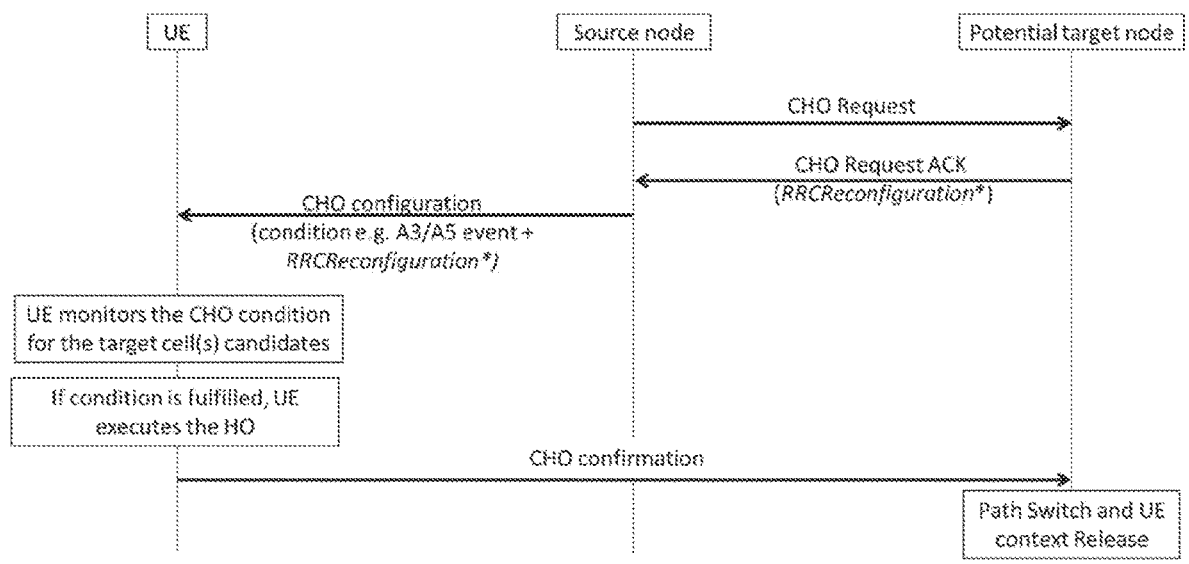
FIG. 2

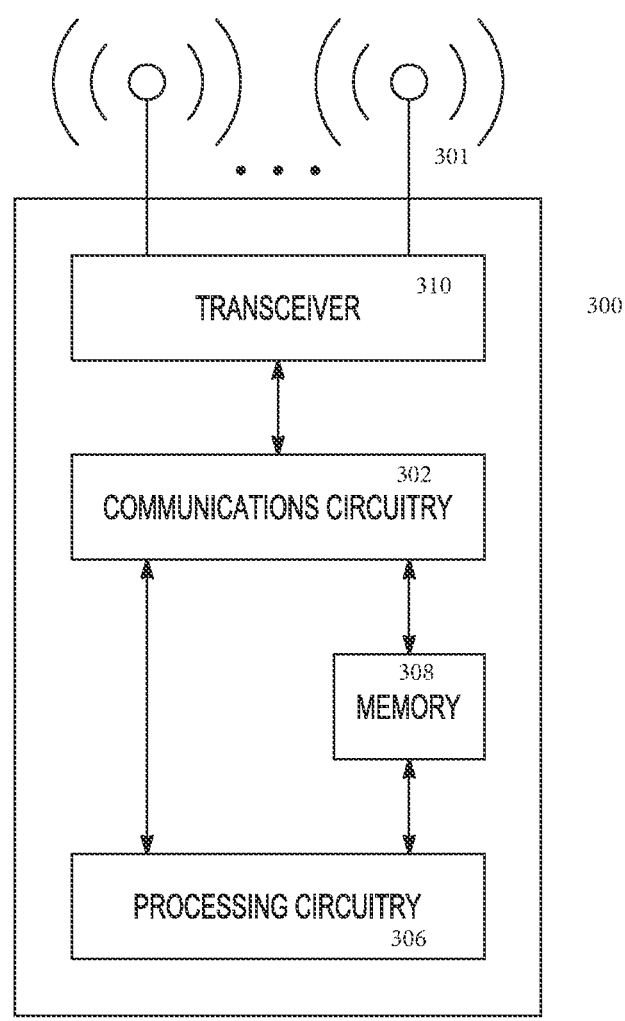

MULTIPLE TRIGGER EVENTS BASED CONDITIONAL HANDOVER IN 5G NR NETWORKS

PRIORITY CLAIM

This application claims priority under 35 USC 119 to U.S. Provisional Patent Application Ser. No. 62/951,848, filed Dec. 20, 2019 [reference number AC7146-Z] which is incorporated herein by reference in its entirety.

TECHNICAL FIELD

Embodiments pertain to cellular communications. Some embodiments relate to fifth generation (5G) new radio (NR) communications. Some embodiments relate to conditional handover in 5G NR networks.

BACKGROUND

One issue with cellular communications is handover failure, particularly when a user equipment (UE) is moving. Handover failure occurs many times because radio conditions have degraded by the time the UE receives the handover command. Thus, there are general needs for systems and methods that reduces handover failure.

BRIEF DESCRIPTION OF THE DRAWINGS

FIG. 1 illustrates a procedure to modify a radio-resource control (RRC) configuration in accordance with some embodiments.

FIG. 2 illustrates a procedure for conditional handover in accordance with some embodiments.

FIG. 3 is a block diagram of a user equipment (UE) in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

FIG. 1 illustrates a procedure to modify RRC configuration in accordance with some embodiments. The purpose of this procedure is to modify an existing RRC connection which may be to establish/modify/release resource blocks (RBs), to perform reconfiguration with sync, to setup/modify/release measurements, to add/modify/release SCells and cell groups, to add/modify/release conditional handover configuration, to add/modify/release conditional PSCell change configuration. As part of the procedure, non-Access Stratum (NAS) dedicated information may be transferred from the network to a user equipment (UE).

In accordance with these embodiments, the network configures the UE with one or more candidate target SpCells in the conditional reconfiguration. The UE evaluates the condition of each configured candidate target SpCell. The UE applies the conditional reconfiguration associated with one of the target SpCells which fulfils associated execution condition. The network provides the configuration parameters for the target SpCell in the Conditional Reconfiguration information element (IE).

In accordance with some embodiments, a UE may decode a radio-resource control (RRC) reconfiguration message comprising a conditional handover (CHO) configuration (CHO-Config) (i.e., condRRCReconfig) (including a CHO IE). In these embodiments, the CHO configuration may identify a CHO configuration for at least one target candidate cell (i.e., a Pcell). The CHO configuration may include two or more CHO triggering events for an entry condition. In these embodiments, the UE may store the CHO configuration in the memory. The UE may monitor measurement quantities of the target candidate cell for the entry condition to determine if any of the CHO triggering events are met, start a first count-down (i.e., time-to-trigger (TTT)) timer when the entry condition of a first of the CHO triggering events is met, and start a second count-down (TTT) timer when the entry condition of a second of the CHO triggering events is met. In these embodiments, UE may apply the stored CHO configuration to the target candidate cell (i.e., now the triggered cell) when both of the two CHO triggering events remain fulfilled upon expiration of the both timers (i.e., the execution condition is satisfied/met when both of the CHO triggering events are simultaneous fulfilled). In these embodiments, the stored CHO configuration may be applied to the target candidate cell if the first of the CHO triggering events remains fulfilled when the second of the CHO triggering events is met. These embodiments are discussed in more detail below.

In some embodiments, the UE also be configured to refrain from applying the stored CHO configuration to the target candidate cell when both of the two CHO triggering events do not remain fulfilled upon expiration of the both timers (i.e., the entry condition is not satisfied since both of the CHO triggering events are not fulfilled).

In some embodiments, for the target candidate cell, the UE may be configured to determine if the first CHO triggering event remains fulfilled after the first TTT timer has expired and upon expiration of the second TTT timer. In these embodiments, the UE may apply the stored CHO configuration to the target candidate cell when both of the first and second CHO triggering events are concurrently fulfilled. In these embodiments, the execution condition for the target candidate cell is satisfied when the second CHO triggering event is fulfilled if the first CHO triggering event remains fulfilled. In these embodiments, two CHO triggering events are handled together with separate TTT timers. The first event must still be valid when a second TTT timer expires to satisfy an entry condition to a new PCell). These embodiments are discussed in more detail below.

In some embodiments, the two or more CHO triggering events comprise at least an Event A3 and an Event A5. These embodiments are discussed in more detail below.

In some embodiments, the two CHO triggering events may be each identified by a measurement ID (measID) included in a measurement ID list (measIdList) within a variable measurement configuration (VarMeasConfig) indicated in the CHO-Config. These embodiments are discussed in more detail below.

In some embodiments, the CHO configuration is to add, modify and/or release a configuration of the target candidate cell for a conditional handover. These embodiments are discussed in more detail below.

In some embodiments, the RRC reconfiguration message may comprise a conditional handover (CHO) command. In these embodiments, the execution condition/trigger events configured for a CHO will not trigger a measurement report to the network. But the network may configure a normal measurement configuration in order to receive a measurement report from the UE (i.e. like in a conventional handover).

In some embodiments, the CHO configuration may identify a CHO configuration for more than one target candidate cell (i.e., a Pcell), although the scope of the embodiments is not limited in this respect. These embodiments are discussed in more detail below. In some embodiments, the CHO configuration may include two or more CHO triggering events for an entry condition. These embodiments are discussed in more detail below.

FIG. 2 illustrates a procedure for conditional handover in accordance with some embodiments. In these embodiments, conditional handover may reduce the number of failure occurrences while a UE is moving (for example, when a handover between cells fails, or when a connection fails even before a handover (HO) is triggered). In conditional handover, instead of preparing one target cell as in the legacy case, multiple candidate target cells are prepared in advance in the network, which enables the handover command to be sent to the UE earlier than at normal handover when the radio conditions are still good, rather than when conditions start to get degraded as in legacy handover.

When received, the UE stores the command, instead of applying it immediately. In some embodiments, the UE may only apply the stored command when an entry condition configured in the UE is satisfied for one of the configured candidate target cells. Then the UE may execute the handover and connects to the target cell as in a normal handover For conditional handover feature, the UE receives a handover command and stores the command without applying it as it would have done in legacy handover. Together with the command, the UE also receives an associated entry condition to be monitored. When the entry condition is fulfilled, the UE applies the previously stored handover command, as if the network would have just sent it, instead of first sending a measurement report (that could fail to be transmitted) and then waiting to receive the command (which may fail to be received).

The entry condition that defines the criteria to apply the stored handover command is based on the quality of the serving cell(s) and neighbor cells, somewhat similar to the condition that in previous releases leads the UE to transmit a measurement report when the condition is fulfilled. For example, the network can configure the UE to transmit a measurement report when a neighbor cell becomes an offset better than the serving cell, as a way to indicate to the network that a handover may be needed. In conditional handover, a similar condition can be configured, except that instead of transmitting the measurement report, the UE applies the stored message. Sending the handover command when the radio conditions are still favorable reduces the risk of failing the transmission of the measurement report and/or the reception of the handover command.

In Rel-16 NR, New WI "NR mobility enhancements" was approved in RP-181433. Conditional handover is one of solutions to improve the robustness:

To improve the robustness, the network can provide the one or multiple candidate cell configuration(s) associated with execution condition (s) to UE. The UE will access the candidate target cell when execution condition is met.

The exaction condition is configured based on measID. At most two MeasID can be configured for the same execution condition (same event, two quantities, same RS type, same measurement object).

Upon failure, the UE will perform CHO if the selection cell is CHO candidate cell and it is the first time of recovery;

The details of execution condition are:

1 Allow having multiple triggering conditions (using "and") for CHO execution of a single candidate cell. Only single RS type per CHO candidate is supported. At most two triggering quantities (e.g. RSRP and RSRQ, RSRP and SINR, etc.) can be configured simultaneously.

2 All event combinations (e.g. A3+A5, A3+A3 and A5+A5) are supported.

3 For A3 event, A3 event offset, hysteresis and time to trigger should be allowed to configure differently for the 2 measID for the same event, same RS type and same measurement object.

4 For A5 event, A5 threshold 1 and A5 threshold 2, hysteresis and time to trigger should be allowed to configure differently for the 2 measID for the same event, same RS type and same measurement object.

5 maxNrofRS-IndexesToReport, maxReportCells, reportAddNeighMeas, reportAmount, reportOnLeave, reportQuantityCell, reportQuantityRS-Indexes, and useWhiteCellList are not supported within the measID that is configured for triggering conditional handover.

The ASN.1 example is shown as below:

| RRCReconfiguration-v16xy-IEs ::= | SEQUENCE { |
|---|---|
| cho-Config-r16 | CHO-Config-r16   OPTIONAL, |
| --Need M | |
| nonCriticalExtension | SEQUENCE { } |
| OPTIONAL | |
| } | |

| RRCReconfiguration-IEs field descriptions |
|---|
| cho-Config |
| Configuration of target candidate cell(s) and execution condition(s) for conditional handover. |

CHO-Config

The IE CHO-Config is used to add, modify and release the configuration of conditional handover.

| CHO-Config information element |
|---|

```
--ASN1START
--TAG-CHO-CONFIG-START
CHO-Config-r16 ::=              SEQUENCE {
    cho-ConfigToRemoveList-r16      CHO-ConfigToRemoveList-r16      OPTIONAL, -- Need N
    cho-ConfigToAddModList-r16      CHO-ConfigToAddModList-r16      OPTIONAL, -- Need N
    attemptCHO-r16                  ENUMERATED {true}               OPTIONAL, — Need N
    ...
}
CHO-ConfigToRemoveList-r16 ::=  SEQUENCE (SIZE (1 ... maxNrofCHO-Cells)) OF CHO-
ConfigId-r16
```

| CHO-Config information element |
|---|
| -- TAG-CHO-CONFIG-STOP<br>-- ASN1STOP |

| CHO-Config field descriptions |
|---|
| attemptCHO<br>If present, the UE shall perform CHO if selected cell is CHO candidate cell and it is the first cell selection after failure as described in 5.3.7.3.<br>cho-ConfigToAddModList<br>List of the configuration of candidate cells to be added or modified.<br>cho-ConfigToRemoveList<br>List of the configuration of candidate cells to be removed. |

CHO-ConfigId

The IE CHO-ConfigId is used to identify a CHO configuration.

| CHO-ConfigId information element |
|---|
| -- ASN1START<br>-- TAG-CHO-CONFIGID-START<br>CHO-ConfigId-r16 ::=        INTEGER (1 . . . maxNrofCHO-Cells)<br>-- TAG-CHO-CONFIGID-STOP<br>-- ASN1STOP |

CHO-ConfigToAddModList

The IE CHO-ConfigToAddModList concerns a list of CHO configurations to add or modify, with for each entry the cho-ConfigId and the associated cho-CandidateCellConfig.

| CHO-ConfigToAddModList information element |
|---|
| -- ASN1START<br>-- TAG-CHO-CONFIGTOADDMODLIST-START<br>CHO-ConfigToAddModList-r16 ::=      SEQUENCE (SIZE (1 . . . maxNrofCHO-Cells)) OF CHO-ConfigToAddMod-r16<br>CHO-ConfigToAddMod-r16 ::=      SEQUENCE {<br>   cho-ConfigId-r16           CHO-ConfigId-r16,<br>   cho-ExecutionCond-r16       SEQUENCE (SIZE (1 . . . 2)) OF MeasId,<br>   cho-RRCReconfig-r16        OCTET STRING (CONTAINING RRCReconfiguration),<br>   . . .<br>}<br>-- TAG-CHO-CONFIGTOADDMODLIST-STOP<br>-- ASN1STOP |

1.—ReportConfigNR

The IE ReportConfigNR specifies criteria for triggering of an NR measurement reporting event or of a CHO event. Measurement reporting events and CHO events are based on cell measurement results, which can either be derived based on SS/PBCH block or CSI-RS. These events are labelled AN with N equal to 1, 2 and so on.

Event A1: Serving becomes better than absolute threshold;

Event A2: Serving becomes worse than absolute threshold;

Event A3: Neighbour becomes amount of offset better than PCell/PSCell;

Event A4: Neighbour becomes better than absolute threshold;

Event A5: PCell/PSCell becomes worse than threshold1 AND Neighbour/SCell becomes better than another absolute threshold2;

Event A6: Neighbour becomes amount of offset better than SCell.

| ReportConfigNR information element |
|---|
| -- ASN1START<br>-- TAG-TUEPORTCONFIGNR-START<br>ReportConfigNR ::=        SEQUENCE {<br>   reportType          CHOICE {<br>      periodical        PeriodicalReportConfig,<br>      eventTriggered    EventTriggerConfig,<br>      . . . ,<br>      reportCGI         ReportCGI, |

-continued

| ReportConfigNR information element |
|---|

```
        reportSFTD              ReportSFTD-NR,
        cho-TriggerConfig-r16   CHO-TriggerConfig-r16
    }
}
ReportCGI ::=               SEQUENCE {
    cellForWhichToReportCGI     PhysCellId,
    ...
}
ReportSFTD-NR ::=           SEQUENCE {
    reportSFTD-Meas             BOOLEAN,
    reportRSRP              BOOLEAN,
    ...,
    [[
    reportSFTD-NeighMeas        ENUMERATED {true}           OPTIONAL, — Need R
    drx-SFTD-NeighMeas          ENUMERATED {true}           OPTIONAL, — Need R
    cellsForWhichToReportSFTD   SEQUENCE (SIZE (1 ... maxCellSFTD)) OF PhysCellId
OPTIONAL — Need R
    ]]
}
CHO-TriggerConfig-r16 ::=   SEQUENCE {
    cho-eventId                 CHOICE {
        cho-eventA3                 SEQUENCE {
            a3-Offset                   MeasTriggerQuantityOffset,
            hysteresis                  Hysteresis,
            timeToTrigger               TimeToTrigger
        },
        cho-eventA5                 SEQUENCE {
            a5-Threshold1               MeasTriggerQuantity;
            a5-Threshold2               MeasTriggerQuantity;
            hysteresis                  Hysteresis,
            timeToTrigger               TimeToTrigger
        },
        ...
    },
    rsType-r16                  NR-RS-Type,
    ...
}
EventTriggerConfig ::=      SEQUENCE {
    eventId                     CHOICE {
        eventA1                     SEQUENCE {
            a1-Threshold                MeasTriggerQuantity,
            reportOnLeave               BOOLEAN,
            hysteresis                  Hysteresis,
            timeToTrigger               TimeToTrigger
        },
        eventA2                     SEQUENCE {
            a2-Threshold                MeasTriggerQuantity,
            reportOnLeave               BOOLEAN,
            hysteresis                  Hysteresis,
            timeToTrigger               TimeToTrigger
        },
        eventA3                     SEQUENCE {
            a3-Offset                   MeasTriggerQuantityOffset,
            reportOnLeave               BOOLEAN,
            hysteresis                  Hysteresis,
            timeToTrigger               TimeToTrigger,
            useWhiteCellList            BOOLEAN
        },
        eventA4                     SEQUENCE {
            a4-Threshold                MeasTriggerQuantity,
            reportOnLeave               BOOLEAN,
            hysteresis                  Hysteresis,
            timeToTrigger               TimeToTrigger,
            useWhiteCellList            BOOLEAN
        },
        eventA5                     SEQUENCE {
            a5-Threshold1               MeasTriggerQuantity,
            a5-Threshold2               MeasTriggerQuantity,
            reportOnLeave               BOOLEAN,
            hysteresis                  Hysteresis,
            timeToTrigger               TimeToTrigger,
            useWhiteCellList            BOOLEAN
        },
        eventA6                     SEQUENCE {
            a6-Offset                   MeasTriggerQuantityOffset,
            reportOnLeave               BOOLEAN,
```

-continued

| ReportConfigNR information element | |
|---|---|
| hysteresis | Hysteresis, |
| timeToTrigger | TimeToTrigger, |
| useWhiteCellList | BOOLEAN |
| }, | |
| ... | |
| }, | |
| rsType | NR-RS-Type, |
| reportInterval | ReportInterval, |
| reportAmount | ENUMERATED {r1, r2, r4, r8, r16, r32, r64, infinity}, |
| reportQuantityCell | MeasReportQuantity, |
| maxReportCells | INTEGER (1 ... maxCellReport), |
| reportQuantityRS-Indexes | MeasReportQuantity |
| OPTIONAL, — Need R | |
| maxNrofRS-IndexesToReport | INTEGER (1 ... maxNrofIndexesToReport) |
| OPTIONAL, — Need R | |
| includeBeamMeasurements | BOOLEAN, |
| reportAddNeighMeas | ENUMERATED {setup} |
| OPTIONAL, — Need R | |
| ... | |
| } | |
| PeriodicalReportConfig ::= | SEQUENCE { |
| rsType | NR-RS-Type, |
| reportInterval | ReportInterval, |
| reportAmount | ENUMERATED {r1, r2, r4, r8, r16, r32, r64, infinity}, |
| reportQuantityCell | MeasReportQuantity, |
| maxReportCells | INTEGER (1 ... maxCellReport), |
| reportQuantityRS-Indexes | MeasReportQuantity |
| OPTIONAL, — Need R | |
| maxNrofRS-IndexesToReport | INTEGER (1 ... maxNrofIndexesToReport) |
| OPTIONAL, — Need R | |
| includeBeamMeasurements | BOOLEAN, |
| useWhiteCellList | BOOLEAN, |
| ... | |
| } | |
| NR-RS-Type ::= | ENUMERATED {ssb, csi-rs} |
| MeasTriggerQuantity ::= | CHOICE } |
| rsrp | RSRP-Range, |
| rsrq | RSRQ-Range, |
| sinr | SINR-Range |
| } | |
| MeasTriggerQuantityOffset ::= | CHOICE { |
| rsrp | INTEGER (−30 ... 30), |
| rsrq | INTEGER (−30 ... 30), |
| sinr | INTEGER (−30 ... 30) |
| } | |
| MeasReportQuantity ::= | SEQUENCE { |
| rsrp | BOOLEAN, |
| rsrq | BOOLEAN, |
| sinr | BOOLEAN |
| } | |
| -- TAG-REPORTCONFIGNR-STOP | |
| -- ASN1STOP | |

Based on the agreements, the offset, TTT, hysteresis, event, quantity can be configured different values for the two trigger events in the same execution condition. It is very likely two events of the same execution condition will be triggered at different time, no matter whether the parameters are same or not. If the first trigger event is invalid when second trigger event is met, it may lead the UE select wrong candidate cell and impact the robustness.

To ensure execution condition is met when entry conditions for two events are fulfilled simultaneously;

Embodiment 1: Handle Two Events Together

The UE checks whether the first event is still fulfilled (remain in the entry condition) when the second event is fulfilled (TTT expires), e.g. the first event TTT expires and second event TTT expires while first event still satisfy entry condition, then we call it execution condition met, e.g. consider the applicable cell as a triggered cell. The changes could be, for example:

The UE shall:

1> for each CHO-ConfigId within the VarCHO-Config:

2> consider the cell which has a physical cell identity matching the value indicated in the ServingCellConfigCommon in the received cho-RRCReconfig to be applicable cell;

2> if two events are associated with the CHO-ConfigId, and the entry conditions applicable for all events associated with the CHO-ConfigId, e.g. the events corresponding with the cho-eventIds of the corresponding cho-TriggerConfig within VarCHO-Config, are fulfilled for the applicable cells for all measurements after layer 3 filtering taken during the corresponding timeToTrigger defined for this event within the VarCHO-Config. and if second TTT expires while the first triggered event (TTT expires first) still satisfy entry condition.

3> consider the applicable cell as a triggered cell;

Embodiment 2: Common Timer for Two Events

The timer A is started when the entry condition for the first event is met, and the second event may be met later when timer A is still running. Consider execution condition is met, e.g. the applicable cell as triggered cell if both trigger events satisfy the entry condition when timer A expires.

The timer A is restarted when the situation of either trigger event is changed from "satisfy the entry condition" to "not satisfy the entry condition".

Embodiment 3: Common Timer Option 2

When first and second event entry condition met, TTT starts.
Either condition leaves, TTT stops
When TTT expires, the execution condition is met.

FIG. 3 is a block diagram of a user equipment (UE) in accordance with some embodiments. The UE 300 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The UE 300 may include communications circuitry 302 and a transceiver 310 for transmitting and receiving signals to and from other communication stations using one or more antennas 301. The communications circuitry 302 may include circuitry that can operate the physical layer (PHY) communications and/or medium access control (MAC) communications for controlling access to the wireless medium, and/or any other communications layers for transmitting and receiving signals. The UE 300 may also include processing circuitry 306 and memory 308 arranged to perform the operations described herein. In some embodiments, the communications circuitry 302 and the processing circuitry 306 may be configured to perform operations detailed in the above figures, diagrams, and flows.

In accordance with some embodiments, the communications circuitry 302 may be arranged to contend for a wireless medium and configure frames or packets for communicating over the wireless medium. The communications circuitry 302 may be arranged to transmit and receive signals. The communications circuitry 302 may also include circuitry for modulation/demodulation, upconversion/downconversion, filtering, amplification, etc. In some embodiments, the processing circuitry 306 of the UE 300 may include one or more processors. In other embodiments, two or more antennas 301 may be coupled to the communications circuitry 302 arranged for sending and receiving signals. The memory 308 may store information for configuring the processing circuitry 306 to perform operations for configuring and transmitting message frames and performing the various operations described herein. The memory 308 may include any type of memory, including non-transitory memory, for storing information in a form readable by a machine (e.g., a computer). For example, the memory 308 may include a computer-readable storage device, read-only memory (ROM), random-access memory (RAM), magnetic disk storage media, optical storage media, flash-memory devices and other storage devices and media.

In some embodiments, the UE 300 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the UE 300 may include one or more antennas 301. The antennas 301 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the UE 300 may include one or more of a keyboard, a display, a non-volatile memory port, multiple antennas, a graphics processor, an application processor, speakers, and other mobile device elements. The display may be an LCD screen including a touch screen.

Although the UE 300 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the UE 300 may refer to one or more processes operating on one or more processing elements.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for a user equipment (UE) configured for operation in a fifth-generation new radio (5G NR) network, the apparatus comprising: processing circuitry; and memory, wherein the processing circuitry is configured to:
   decode a radio-resource control (RRC) reconfiguration message comprising a conditional handover (CHO) configuration (CHO-Config), the CHO configuration to identify a CHO configuration for a target candidate cell, the CHO configuration including two CHO triggering events for an entry condition;
   store the CHO configuration in the memory;
   monitor measurement quantities of the target candidate cell for the entry condition to determine if any of the CHO triggering events are met;
   start a first count-down timer when the entry condition of a first of the CHO triggering events is met;
   start a second count-down timer when the entry condition of a second of the CHO triggering events is met; and apply the stored CHO configuration to the target candidate cell when both of the two CHO triggering events remain fulfilled upon expiration of the both timers.

2. The apparatus of claim 1, wherein the processing circuitry is further configured to refrain from applying the stored CHO configuration to the target candidate cell when both of the two CHO triggering events do not remain fulfilled upon expiration of the both timers.

3. The apparatus of claim 2, wherein for the target candidate cell, the processing circuitry is configured to:
    determine if the first CHO triggering event remains fulfilled upon expiration of the second count-down timer; and
    apply the stored CHO configuration to the target candidate cell when both of the first and second CHO triggering events are concurrently fulfilled.

4. The apparatus of claim 3, wherein the two CHO triggering events comprise an Event A3 and an Event A5.

5. The apparatus of claim 4, wherein the two CHO triggering events are each identified by a measurement ID (measID) included in a measurement ID list (measIdList) within a variable measurement configuration (VarMeasConfig) indicated in the CHO-Config.

6. The apparatus of claim 5, wherein the CHO configuration is to add, modify and/or release a configuration of the target candidate cell for a conditional handover.

7. The apparatus of claim 6, wherein the RRC reconfiguration message comprises a conditional handover (CHO) command.

8. The apparatus of claim 6, wherein the CHO configuration identifies a CHO configuration for more than one target candidate cell.

9. The apparatus of claim 6, wherein the CHO configuration includes two or more CHO triggering events for an entry condition.

10. The apparatus of claim 1, wherein the processing circuitry comprises a baseband processor, and wherein the UE comprises two or more antennas.

11. A non-transitory computer-readable storage medium that stores instructions for execution by processing circuitry of a user equipment (UE) configured for operation in a fifth-generation new radio (5G NR) network, wherein the processing circuitry is configured to:
    decode a radio-resource control (RRC) reconfiguration message comprising a conditional handover (CHO) configuration (CHO-Config), the CHO configuration to identify a CHO configuration for a target candidate cell, the CHO configuration including two CHO triggering events for an entry condition;
    store the CHO configuration in memory;
    monitor measurement quantities of the target candidate cell for the entry condition to determine if any of the CHO triggering events are met;
    start a first count-down timer when the entry condition of a first of the CHO triggering events is met;
    start a second count-down timer when the entry condition of a second of the CHO triggering events is met; and
    apply the stored CHO configuration to the target candidate cell when both of the two CHO triggering events remain fulfilled upon expiration of the both timers.

12. The non-transitory computer-readable storage medium of claim 11, wherein the processing circuitry is further configured to refrain from applying the stored CHO configuration to the target candidate cell when both of the two CHO triggering events do not remain fulfilled upon expiration of the both timers.

13. The non-transitory computer-readable storage medium of claim 12, wherein for the target candidate cell, the processing circuitry is configured to:
    determine if the first CHO triggering event remains fulfilled upon expiration of the second timer; and
    apply the stored CHO configuration to the target candidate cell when both of the first and second CHO triggering events are concurrently fulfilled.

14. The non-transitory computer-readable storage medium of claim 13, wherein the two CHO triggering events comprise an Event A3 and an Event A5.

15. The non-transitory computer-readable storage medium of claim 14, wherein the two CHO triggering events are each identified by a measurement ID (measID) included in a measurement ID list (measIdList) within a variable measurement configuration (VarMeasConfig) indicated in the CHO-Config.

16. The non-transitory computer-readable storage medium of claim 15, wherein the CHO configuration is to add, modify and/or release a configuration of the target candidate cell for a conditional handover.

17. The non-transitory computer-readable storage medium of claim 16, wherein the RRC reconfiguration message comprises a conditional handover (CHO) command.

18. The non-transitory computer-readable storage medium of claim 16, wherein the CHO configuration identifies a CHO configuration for more than one target candidate cell, and
    wherein the CHO configuration includes two or more CHO triggering events for an entry condition.

19. An apparatus for a generation node B (gNB) configured for operation in a fifth-generation new radio (5G NR) network, the apparatus comprising:
    processing circuitry to encode a radio-resource control (RRC) reconfiguration message comprising a conditional handover (CHO) configuration (CHO-Config) for transmission to a user equipment (UE), the CHO configuration to identify a CHO configuration for a target candidate cell, the CHO configuration including at least two CHO triggering events for an entry condition, the CHO configuration to configure the UE to monitor measurement quantities of the target candidate cell for the entry condition to determine if any of the CHO triggering events are met and apply the CHO configuration to the target candidate cell when both of the CHO triggering events remain fulfilled; and
    memory is configured to store the CHO configuration.

20. The apparatus of claim 19, wherein prior to transmitting the CHO-Config to the UE, the processing circuitry is further configured to:
    send a CHO request to the target candidate cell; and
    receive a CHO request acknowledgement (ACK) from the target candidate cell.

* * * * *